(12) United States Patent
Misra et al.

(10) Patent No.: US 12,681,702 B1
(45) Date of Patent: Jul. 14, 2026

(54) OVERCOMING LANGUAGE MODEL TOKEN LIMITS WHEN CONVERTING EXECUTABLE CODE

(71) Applicant: Intuit Inc., Mountain View, CA (US)

(72) Inventors: Aveek Misra, Bangalore (IN); Amit Tripathy, Bangalore (IN); Akash Rai, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/346,412

(22) Filed: Sep. 30, 2025

(51) Int. Cl.
  *G06F 8/41*　　　(2018.01)
  *G06F 40/40*　　(2020.01)
(52) U.S. Cl.
  CPC ................ *G06F 8/41* (2013.01); *G06F 40/40* (2020.01)
(58) Field of Classification Search
  CPC .................................. G06F 40/40; G06F 8/41
  See application file for complete search history.

(56) References Cited

U.S. PATENT DOCUMENTS

2025/0306870 A1* 10/2025 Hendricks ................. G06F 8/40
2025/0335717 A1* 10/2025 Zhang ..................... G06F 40/40

OTHER PUBLICATIONS

Guo et al. "When to stop? towards efficient code generation in llms with excess token prevention." Proceedings of the 33rd ACM SIGSOFT International Symposium on Software Testing and Analysis. 2024. Retrieved on Apr. 13, 2026 from the Internet: URL<https://dl.acm.org/doi/pdf/10.1145/3650212.3680343> (Year: 2024).*
Li, Jia, et al. "Acecoder: An effective prompting technique specialized in code generation." ACM Transactions on Software Engineering and Methodology 33.8 (2024): 1-26. Retrieved on Apr. 13, 2026 from the Internet:<https://dl.acm.org/doi/pdf/10.1145/3675395> (Year: 2024).*
Qodo, "Review Smart, Automate Dev Workflows, Code", https://www.qodo.ai, Jan. 1, 2025, 10 pages.

* cited by examiner

Primary Examiner — S. Sough
Assistant Examiner — Cheneca Smith
(74) Attorney, Agent, or Firm — Lathrop GPM LLP

(57) ABSTRACT

A method of overcoming a token limit of a language model when converting an existing computer executable code to a modified computer executable code. The method includes generating a code segment from the existing computer executable code. The code segment is generated to be within the token limit. The method also includes identifying a prompt that instructs the language model to generate the modified computer executable code. The prompt includes a system command instructing the language model to convert the code segment to the modified computer executable code. The prompt also includes the code segment. The prompt also includes a map defining a mapping between the code segment and the modified computer executable code. The method also includes processing the language model on the prompt to output the modified computer executable code. The method also includes returning the modified computer executable code.

18 Claims, 10 Drawing Sheets

START

GENERATE A CODE SEGMENT FROM EXISTING COMPUTER EXECUTABLE CODE — 200

IDENTIFY A PROMPT THAT INSTRUCTS THE LANGUAGE MODEL TO GENERATE MODIFIED COMPUTER EXECUTABLE CODE — 202

PROCESS THE LANGUAGE MODEL ON THE PROMPT TO OUTPUT MODIFIED COMPUTER EXECUTABLE CODE — 204

RETURN THE MODIFIED COMPUTER EXECUTABLE CODE — 206

END

402

```
SELECT DISTINCT Uuid(Concat(offer.eco_company_offering_key, Cast(
                txd.customer_id AS STRING))) AS
                company_customer_key,
                Txd.customer_id AS company_customer_id,
                c.name_name
                AS company_customer_name,
                CASE
                  WHEN Lower(c.name_name) LIKE '%company1%' THEN
company1
                    ELSE 'others'
                END
                AS cleanedup_customer_group,
                offer.eco_company_offering_key
                AS eco_company_offering_key,
                Cast(c.hidden AS BOOLEAN)
                AS is_hidden_ind,
                txd.company_id,
                source.source_system_key
                AS source_system_key
FROM    sbseg_dm.dim_eco_stg_firmographic firmo
        LEFT JOIN sbseg_dm.dim_eco_company_offering offer
            ON offer.eco_company_offering_key =
firmo.eco_company_offering_key
                AND offer.ecosystem_offering_name = product
        INNER JOIN txdetails_vw txd
            ON firmo.qbo_company_id = txd.company_id
        INNER JOIN ued_qbo_dwh.customers_vw c
            ON txd.customer_id = c.name_id
                AND txd.company_id = c.company_id
        LEFT JOIN sbseg_dm.dim_source_system source
            ON source.source_system_code = product
WHERE   txd.customer_id IS NOT NULL
        AND offer.eco_company_offering_key IS NOT NULL
```

Example mapping csv:

| Example mapping csv: -source_table_name | source_column_name | target_table_name | target_column_name | col_hashkey | tab_hashkey |
|---|---|---|---|---|---|
| sbseg_dm.dim _eco_stg_firmo graphic | personId | Microservice_table. dim_eco_stg_firmo graphic_domain | id | col_9fb4f72e 59589ea5d4 57e86ddd64 8d33 | tab_56b28cc8f70 23e32d86d38cc7 e986531 |
| sbseg_dm.dim _eco_company _offering | eco_compan y_offering_k ey | Microservice_table. dim_eco_company _offering_domain | eco_company_offer ing_key | col_cc88454 5faa744e595 014b738d25 c811 | tab_cc884545faa 744e595014b738 d25c811 |
| sbseg_dm.dim _eco_company _offering | ecosystem_ offering_nam e | Microservice_table. dim_eco_company _offering_domain | ecosystem_offering _name_domain_ev ent | col_b3488d7 e438c88b58 6d35630fd4a f956 | tab_cc884545faa 744e595014b738 d25c811 |
| ued_qbo_dwh. customers_vw | company_id | Microservice_table. customers_vw_do main | company_id_domai n_event | col_67be8de 35318820a9 27ae8d3571 eh123 | tab_67be8de353 18820a927ae8d3 571e413e |
| ued_qbo_dwh. customers_vw | name_name | Microservice_table. customers_vw_do main | name_name_doma in_event | col_67be8de 35318820a9 27ae8d3571 e413e | tab_67be8de353 18820a927ae8d3 571e413e |

*FIG. 4B*

LLM-1 -Output 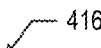 416

```
SELECT DISTINCT Uuid(Concat(offer.eco_company_offering_key,
Cast(txd.customer_id AS STRING))) AS company_customer_key,
                  txd.customer_id
AS company_customer_id,
                  c.col_67be8de35318820a927ae8d3571e413e
AS name_name as company_customer_name,
             CASE
                      WHEN
lower(c.col_67be8de35318820a927ae8d3571e413e) LIKE '%company1%' THEN
company1
                      WHEN
lower(c.col_67be8de35318820a927ae8d3571e413e) LIKE '%company2%' THEN
company1
                      WHEN
lower(c.col_67be8de35318820a927ae8d3571e413e) LIKE '%company3%' THEN
'company3'
                      WHEN
lower(c.col_67be8de35318820a927ae8d3571e413e) LIKE '%company4%' THEN
'company4'
                      WHEN
lower(c.col_67be8de35318820a927ae8d3571e413e) LIKE '%company5%' THEN
'company4'
                      WHEN
lower(c.col_67be8de35318820a927ae8d3571e413e) LIKE '%company6%' THEN
'company4'
                      WHEN ( lower(c.col_67be8de35318820a927ae8d3571e413e) LIKE '%company7%')
                      OR              ( lower(c.col_67be8de35318820a927ae8d3571e413e) LIKE '%company8%') THEN
'company8'
                      WHEN
lower(c.col_67be8de35318820a927ae8d3571e413e) LIKE '%company9%' THEN
'company8'
                      WHEN
lower(c.col_67be8de35318820a927ae8d3571e413e) LIKE '%company10%'
                      OR
lower(c.col_67be8de35318820a927ae8d3571e413e) LIKE '%company11%' THEN
'company11'
                      WHEN
lower(c.col_67be8de35318820a927ae8d3571e413e) LIKE '%company12%'
                      OR
lower(c.col_67be8de35318820a927ae8d3571e413e) LIKE '%company12%' THEN
'company12'
                      WHEN
lower(c.col_67be8de35318820a927ae8d3571e413e) LIKE '%company13%'
                      OR
lower(c.col_67be8de35318820a927ae8d3571e413e) LIKE '%company14%' THEN
'company14'
                      ELSE 'others'
                                           END,
                      ●                    AS
                      ●
                      ●
```

*FIG. 4C*

```
cleanedup_customer_group,
                offer.col_cc884545faa744e595014b738d25c811 AS
eco_company_offering_key,
                                                          AS
eco_company_offering_key,
                cast(c.hidden AS boolean),
                AS is_hidden_ind,
                txd.company_id,
                source.source_system_key AS source_system_key
FROM            tab_56b28cc8f7023e32d86d38cc7e986531 firmo
LEFT JOIN       tab_cc884545faa744e595014b738d25c811 offer
ON              offer.col_cc884545faa744e595014b738d25c811 =
firmo.eco_company_offering_key AND             offer.col_b3488d7e438c88b586d35830fd4af956 = 'Product'
INNER JOIN      txdetails_vw txd
ON              firmo.qbo_company_id = txd.company_id
INNER JOIN      tab_67be8de35318828a927ae8d3571e413e c
ON              txd.customer_id = c.name_id
AND             txd.company_id = c.company_id
LEFT JOIN       sbseg_dm.dim_source_system source
ON              source.source_system_code = 'product'
WHERE           txd.customer_id IS NOT NULL
AND             offer.eco_company_offering_key IS NOT NULL
```

Final Output

418

```
SELECT DISTINCT Uuid(Concat(offer.eco_company_offering_key,
Cast(txd.customer_id AS STRING))) AS company_customer_key,
                    txd.customer_id
AS company_customer_id,
                    c.name_name_domain_event
AS name_name as company_customer_name,
                    CASE
                                    WHEN lower(c.name_name_domain_event) LIKE
'%company1%' THEN company1
                                    WHEN lower(c.name_name_domain_event) LIKE
'%company2%' THEN company1
                                    WHEN lower(c.name_name_domain_event) LIKE
'%company3%' THEN 'company3'
                                    WHEN lower(c.name_name_domain_event) LIKE
'%company4%' THEN 'company4'
                                    WHEN lower(c.name_name_domain_event) LIKE
'%company5%' THEN 'company4'
                                    WHEN lower(c.name_name_domain_event) LIKE
'%company6%' THEN 'company4'
                                    WHEN ( lower(c.name_name_domain_event) LIKE '%company7%')
                                    OR              ( lower(c.name_name_domain_event) LIKE '%company8%') THEN 'company8'
```

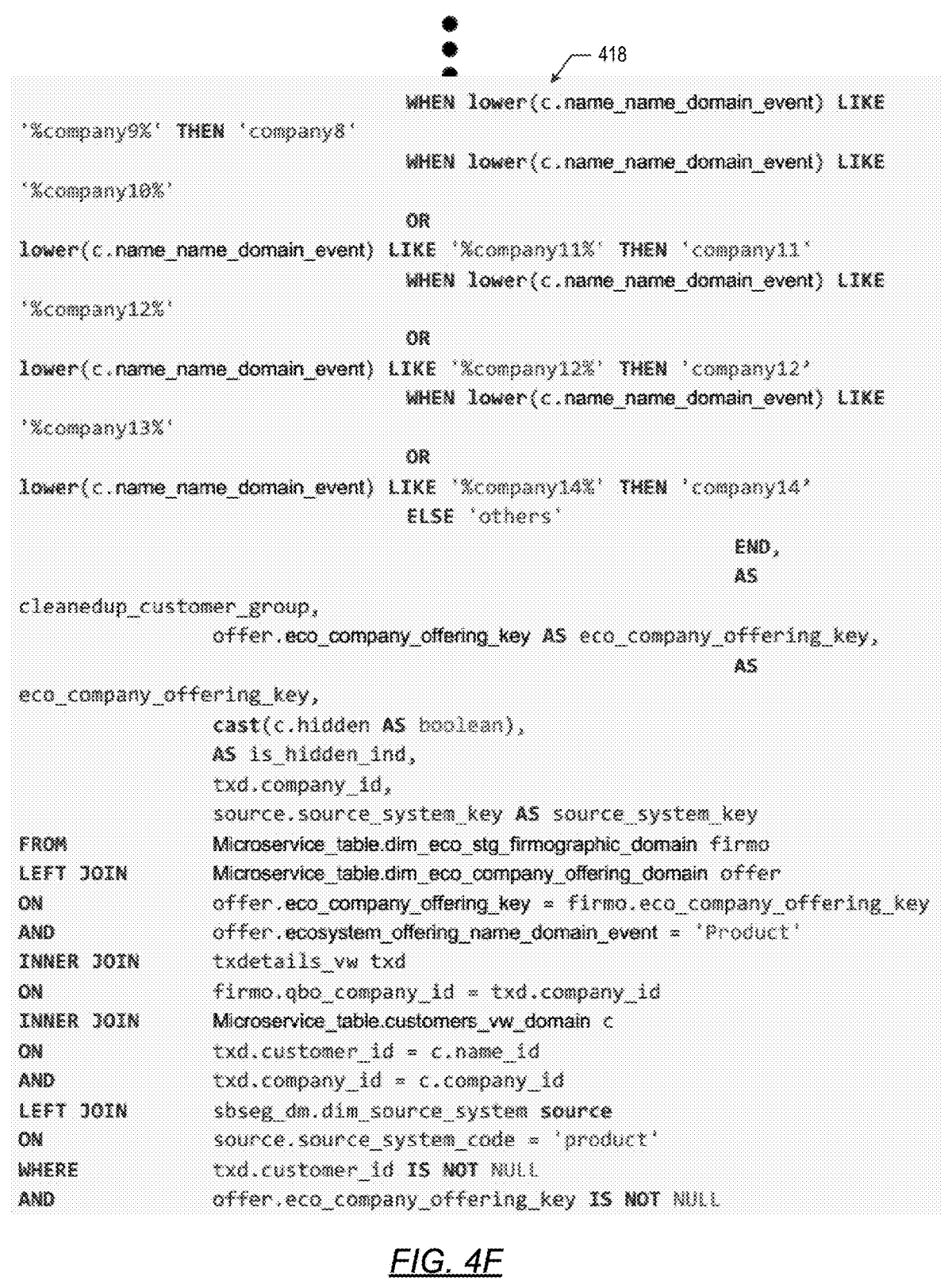

```
                              WHEN lower(c.name_name_domain_event) LIKE
'%company9%' THEN 'company8'
                              WHEN lower(c.name_name_domain_event) LIKE
'%company10%'
                              OR
lower(c.name_name_domain_event) LIKE '%company11%' THEN 'company11'
                              WHEN lower(c.name_name_domain_event) LIKE
'%company12%'
                              OR
lower(c.name_name_domain_event) LIKE '%company12%' THEN 'company12'
                              WHEN lower(c.name_name_domain_event) LIKE
'%company13%'
                              OR
lower(c.name_name_domain_event) LIKE '%company14%' THEN 'company14'
                              ELSE 'others'
                                                        END,
                                                        AS
cleanedup_customer_group,
             offer.eco_company_offering_key AS eco_company_offering_key,
                                                        AS
eco_company_offering_key,
             cast(c.hidden AS boolean),
             AS is_hidden_ind,
             txd.company_id,
             source.source_system_key AS source_system_key
FROM         Microservice_table.dim_eco_stg_firmographic_domain firmo
LEFT JOIN    Microservice_table.dim_eco_company_offering_domain offer
ON           offer.eco_company_offering_key = firmo.eco_company_offering_key
AND          offer.ecosystem_offering_name_domain_event = 'Product'
INNER JOIN   txdetails_vw txd
ON           firmo.qbo_company_id = txd.company_id
INNER JOIN   Microservice_table.customers_vw_domain c
ON           txd.customer_id = c.name_id
AND          txd.company_id = c.company_id
LEFT JOIN    sbseg_dm.dim_source_system source
ON           source.source_system_code = 'product'
WHERE        txd.customer_id IS NOT NULL
AND          offer.eco_company_offering_key IS NOT NULL
```

*FIG. 4F*

500
COMPUTING
SYSTEM

OVERCOMING LANGUAGE MODEL TOKEN LIMITS WHEN CONVERTING EXECUTABLE CODE

BACKGROUND

Language models, such as large language models (e.g., CHATGPT® by Open AI, LLC) are a type of artificial intelligence (i.e., a machine learning model) designed to understand, generate, and manipulate human language. Language models may be, for example, transformer artificial neural networks. In any case, language models analyze patterns in massive amounts of text data and learn how words, phrases, and sentences relate to one another. Language models then are able predict an answer to a prompt by predicting a next token (e.g., a word) in a sequence of tokens. Language models are increasingly used for a variety of computing tasks due to their versatility.

However, language models have certain limitations or constraints. One significant limitation is that a language model has a constraint on the maximum number of tokens that may be input into or output from a language model. A "token" is a fundamental building block of text that a language model processes. For example, a token may be entire words, parts of words, characters, or punctuation.

While a large language model may have input or output token limits of tens of thousands of tokens each, the limitation still may be a technical problem in some applications. For example, when converting computer executable code from one form to another, both the input token limit and the output token limits may be exceeded. The conversion of computer executable code may be particularly problematic when converting extract, transform, and load (ETL) computer executable code. ETL computer executable code may involve large code blocks and also may refer to large data sources.

Thus, a technical problem is presented. The technical problem is how to overcome language model token limits when converting or modifying computer executable code using a language model.

SUMMARY

One or more embodiments provide for a method of overcoming a token limit of a language model when converting an existing computer executable code to a modified computer executable code. The method includes generating a code segment from the existing computer executable code. The code segment is generated to be within the token limit. The method also includes identifying a prompt that instructs the language model to generate the modified computer executable code. The prompt includes a system command instructing the language model to convert the code segment to the modified computer executable code. The prompt also includes the code segment. The prompt also includes a map defining a mapping between the code segment and the modified computer executable code. The method also includes processing the language model on the prompt to output the modified computer executable code. The method also includes returning the modified computer executable code.

One or more embodiments provide for a system. The system includes a computer processor and a data repository in communication with the computer processor. The data repository stores an existing computer executable code. The data repository also stores a code segment from the existing computer executable code. The data repository also stores a modified computer executable code. The data repository also stores a map defining a mapping between the code segment and the modified computer executable code. The data repository also stores a prompt that instructs a language model to generate the modified computer executable code. The prompt includes a system command instructing the language model to convert the code segment to the modified computer executable code. The prompt also includes the code segment. The prompt also includes the map. The system also includes the language model, executable by the computer processor and including a token limit. The code segment is within the token limit. The system also includes a server controller executable by the computer processor to generate the code segment. The server controller is further executable to process the language model on the prompt to output the modified computer executable code. The server controller is further executable to return the modified computer executable code.

One or more embodiments also provide for a method of overcoming a token limit of a language model when converting an existing computer executable code to a modified computer executable code. The method includes generating a code segment from the existing computer executable code. The code segment is generated to be within the token limit. The method also includes extracting a portion of an updated data source upon which the modified computer executable code is to execute, and upon which the existing computer executable code cannot execute to generate a desired output. The portion is within the token limit. The method also includes hashing at least one of the code segment and the data source. Hashing generates a hashed data structure. The hashed data structure and the map is within the token limit. The method also includes identifying a prompt that instructs the language model to generate the modified computer executable code. The prompt includes a system command instructing the language model to convert the code segment to the modified computer executable code. The prompt also includes the map. The prompt also includes the hashed data structure. A combination of the system command, the map, and the hashed data structure is within the token limit. The method also includes processing the language model on the prompt to output a provisional computer executable code. The method also includes replacing the hashed data structure in the provisional computer executable code with the at least one of the code segment and the data source to generate the modified computer executable code. The method also includes returning the modified computer executable code.

Other aspects of one or more embodiments will be apparent from the following description and the appended claims.

BRIEF DESCRIPTION OF DRAWINGS

FIG. 4A, FIG. 4B, FIG. 4C, FIG. 4D, FIG. 4E, and FIG. 4F show an example of the conversion of ETL computer executable code, in accordance with one or more embodiments.

Like elements in the various figures are denoted by like reference numerals for consistency.

DETAILED DESCRIPTION

Figure 1:
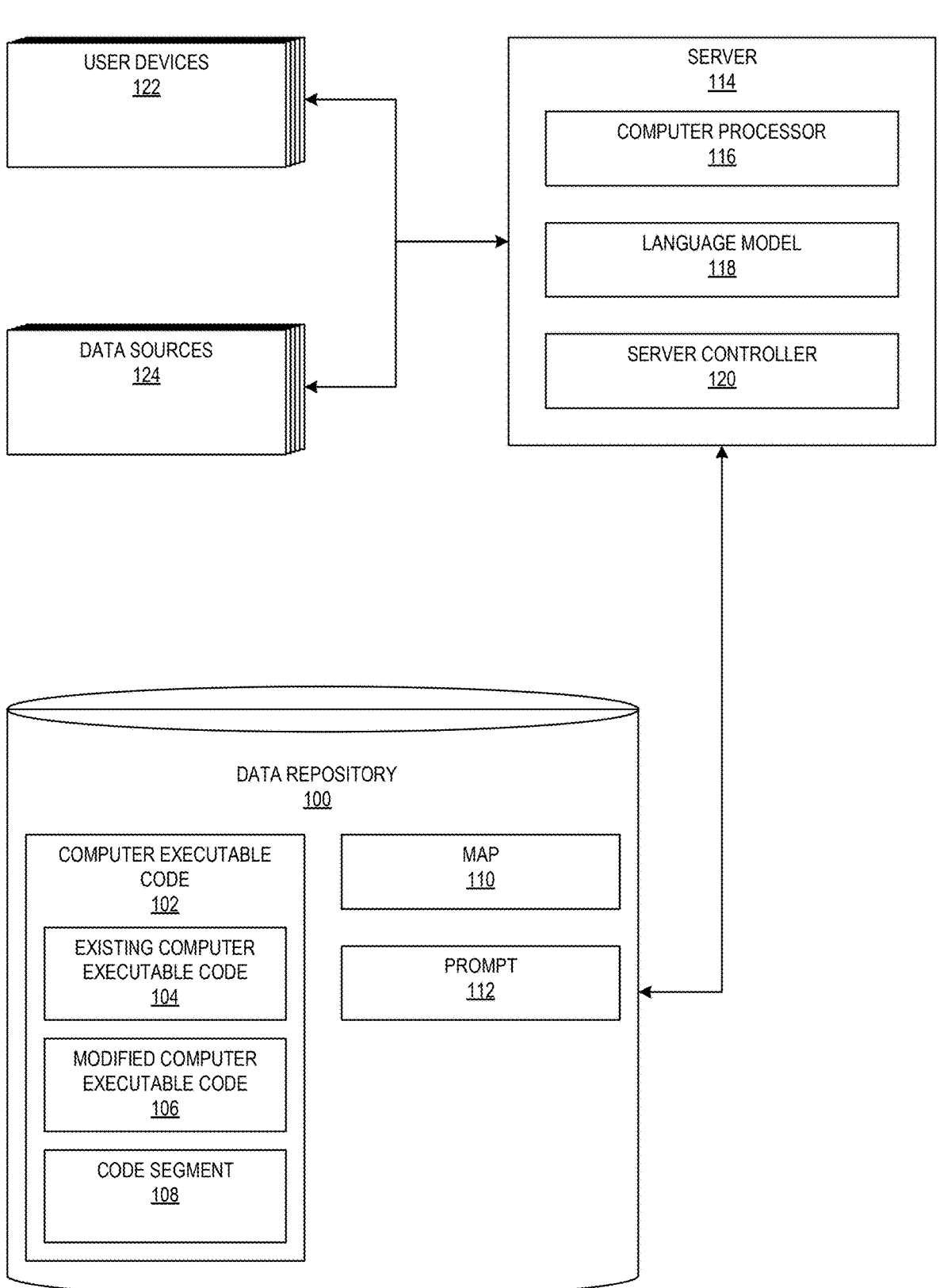
FIG. 1 shows a computing system for overcoming language model token limits when converting executable code, in accordance with one or more embodiments.

One or more embodiments are directed to one or more technical solutions to the technical problem of how to overcome language model token limits when using the language model to convert computer executable code. One or more embodiments present one or more technical solutions to the technical problem by prompt engineering techniques. Prompt engineering is the process of specifying a prompt to a language model that modifies how the language model executes. More generally, a prompt is a command to a language model to perform a task. However, the prompt also may include other information, such as data sources to which the language model should refer, examples that the language model should consider when predicting output tokens, and other information.

In summary, one or more embodiments present a prompt engineering solution to overcome the token limit of the language model when converting existing computer executable code to a modified computer executable code. Briefly, a code segment is generated from the existing computer executable code. The code segment is a portion of the existing computer executable code. The code segment is within the token limit of the language model.

The prompt is then written to include a system command instructing the language model to convert the code segment to the modified computer executable code. The prompt also includes the code segment. The prompt also includes a map defining a mapping between the current sources (e.g., a code segment) and the target sources (e.g., a modified code segment) for the computer executable code. The prompt also may include some or all information in an updated data source upon which the modified computer executable code is to be executed, and upon which the existing computer executable code cannot execute. In an embodiment, information in the mapping (or in the updated data source) may be hashed to conserve more tokens.

The prompt, when completed, is then processed by the language model. The output of the language model is the modified computer executable code. The modified computer executable code is then returned (e.g., stored in a data repository, presented for use, displayed, etc.).

One or more embodiments are particularly useful for automatically updating extract, transform, and load (ETL) computer executable code. Many different ETL computer executable code sets may be available in an enterprise system. The ETL computer executable code sets are used to process various types of remote data sources. However, data sources change on a regular basis (e.g., the format of the data source may change, data types of the data source may change, additional or fewer types of data may be available at the data source, etc.). Updated data sources, therefore, may cause existing ETL computer executable code sets to no longer function as desired, such as to return errors, return converted data incorrectly, etc.

Continually revising the ETL computer executable code sets to accommodate updated data sources is time consuming and difficult. However, many ETL computer executable code sets cannot be converted using language models, because most ETL computer executable code sets exceed language model token limits, particularly if sample modified data sources are included in the prompt that commands the language model to convert the existing ETL computer executable code sets to the modified ETL computer executable code sets. However, one or more embodiments overcome the token limits of language models, thereby improving a computing system to be able to use language models to convert ETL computer executable code sets as data sources are updated.

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores computer executable code (102). The computer executable code (102) is machine-readable code which, when executed by the computer processor (116), executes a computing function on the server (114). In an embodiment, the computer executable code (102) may execute on one or more of the data sources (124) (defined below) to extract information from the data sources (124). However, the computer executable code (102) may be various forms of machine-readable code for performing a variety of different executable functions on a computer system.

The computer executable code (102) may include existing computer executable code (104). The existing computer executable code (104) is the computer executable code (102) prior to transformation from one form to another, as described with respect to FIG. 2.

The computer executable code (102) also includes modified computer executable code (106). The modified computer executable code (106) is the computer executable code (102) after the language model (118) (defined below) has transformed the existing computer executable code (104) according to the instructions in the prompt (112) (defined below).

The modified computer executable code (106) may be different from the existing computer executable code (104) according to a number of different parameters, depending on the specific code conversion task being performed. In an embodiment, the existing computer executable code (104) refers to an existing data object type distributed by a third-party. The third-party updates the existing data object type to a modified data object type. The existing computer executable code (104) cannot execute appropriately (or at all) on the existing computer executable code (104), because of differences between the two data objects. Thus, the modified computer executable code (106) changes the existing computer executable code (104) so that the modified computer executable code (106) may execute on the modified data object type.

In another embodiment, the existing computer executable code (104) is written in a first computer language and the modified computer executable code (106) is written in a second computer language, different than the first computer language. Thus, the modified computer executable code (106) may accomplish a similar or the same function as the existing computer executable code (104). However, the modified computer executable code (106) may be expressed in a modified computer language, which may be more suitable for use on a different computing system than a previous computing system which executed the existing computer executable code (104).

One or more embodiments contemplate other code transformation types when using the language model (118) to transform the existing computer executable code (104) to the modified computer executable code (106). Therefore, other examples are also possible.

The computer executable code (102) also includes a code segment (108). The code segment (108) is a portion of the computer executable code (102). In an embodiment, the code segment (108) is all of the existing computer executable code (104). However, more commonly, the code segment (108) is a portion of the existing computer executable code (104) that is less than all of the existing computer executable code (104). One or more embodiments contemplate that, to overcome the token limit of the language model, the existing computer executable code (104) may be broken into various different code segments (of which the code segment (108) is one). Each code of the multiple segments may be a logically contained set of computer executable code (i.e., computer executable code that may be treated as its own sub-program having an input and an output).

The size of the code segment (108) may be selected according to other tokens that are to be included in the prompt (112). For example, if the prompt (112) includes examples of how the existing computer executable code (104) should be converted into the modified computer executable code (106), then the examples may use a certain number of example tokens. Similarly, if the prompt (112) includes a sample data object upon which the modified computer executable code (106) is to execute (or, possibly in addition, a sample older data object upon which the existing computer executable code (104) executed), then a certain number of data object tokens may be expected.

Furthermore, the prompt (112) may include a system command that limits how the language model should perform the code conversion process. Yet further, the prompt (112) may include the map (110), defined below, which may use a certain number of map tokens.

Thus, the size of the code segment (108) may be selected such that the sum of the tokens in the code segment (108) and all other tokens in the prompt (e.g., the example tokens, the data model tokens, system command tokens, the map tokens, and possibly many other types of tokens) remains within the overall token limit of the language model (118). Accordingly, the overall prompt (112) may be kept within the overall token input limit of the language model (118).

The data repository (100) also stores a map (110). The map (110) is a set of definitions that describe how aspects of the existing computer executable code (104) should be converted into aspects of the modified computer executable code (106). An "aspect" of computer executable code refers to lines, words, commands, symbols, calls, computer language, etc., in the computer executable code (102) (whether existing or modified). For example, the map (110) may indicate that a line of code in the existing computer executable code (104) should be replaced with a modified set of lines expressed in the modified computer executable code (106), and that the modified set of lines should refer to a different data object type. In another example, the map (110) may issue a command expressed in the C++ programming language (or other object oriented language) that may be replaced with a command expressed in the Python programming language or in the hypertext transfer protocol (HTTP) language, or vice versa.

Still other example maps are possible. In any case, the map (110) may be included in the prompt (112) (defined below) so that the language model (118) is provided with examples or instructions regarding how to convert the existing computer executable code (104) to the modified computer executable code (106).

The data repository (100) also may store the prompt (112). The prompt (112) is a set of commands, instructions, examples, and data sources that both instruct the language model (118) to convert the existing computer executable code (104) to the modified computer executable code (106) and also instruct the language model (118) on how the transformation is to be performed.

The system shown in FIG. 1 may include other components. For example, the system shown in FIG. 1 also may include a server (114). The server (114) is one or more computer processors, data repositories, communication devices, and/or supporting hardware and software. The server (114) may be in a distributed computing environment. The server (114) is configured to execute one or more applications, such as the language model (118) and the server controller (120). An example of a computer system and network that may form the server (114) is described with respect to FIG. 5A and FIG. 5B.

The server (114) includes a computer processor (116). The computer processor (116) is one or more hardware or virtual processors which may execute computer readable program code that defines one or more applications, such as the language model (118) and server controller (120). An example of the computer processor (116) is described with respect to the computer processor(s) (502) of FIG. 5A.

The server (114) also includes a language model (118). The language model (118) is a natural language processing machine learning model. An example of the language model (118) may be a large language model, such as CHATGPT®, a neural network, etc. However, different language models may be used. Use of the language model (118) is described with respect to FIG. 2.

The server (114) also may include a server controller (120). The server controller (120) is software or application specific hardware which, when executed by the computer processor (116), controls and coordinates operation of the software or application specific hardware described herein. Thus, the server controller (120) may control and coordinate execution of the method FIG. 2, including use of the language model (118).

The system shown in FIG. 1 also may include one or more user devices (122). The user devices (122) are computing systems (e.g., the computing system (500) shown in FIG. 5A) that communicate with the server (114).

The user devices (122) may be considered remote or local. A remote user device is a device operated by a third-party (e.g., an end user of a chatbot) that does not control or operate the system of FIG. 1. Similarly, the organization that controls the other elements of the system of FIG. 1 may not control or operate the remote user device. Thus, a remote user device may not be considered part of the system of FIG. 1.

In contrast, a local user device is a device operated under the control of the organization that controls the other components of the system of FIG. 1. Thus, a local user device may be considered part of the system of FIG. 1.

The system shown in FIG. 1 also may include one or more data sources (124). As with the user devices (122), the data sources (124) may be remote (i.e., not part of the system of FIG. 1) or local (i.e., part of the system of FIG. 1). Each of the data sources (124) contains data that may be processed by the computer executable code (102). In one or more embodiments, the types of the data sources (124) may change from time to time. When the types of the data sources (124) change (e.g., modified data entries are added or removed) in each data source object, the existing computer executable code (104) may be updated to the modified computer executable code (106), as described with respect to FIG. 2.

While FIG. 1 shows a configuration of components, other configurations may be used without departing from the scope of one or more embodiments. For example, various components may be combined to create a single component. As another example, the functionality performed by a single component may be performed by two or more components.

Figure 2:
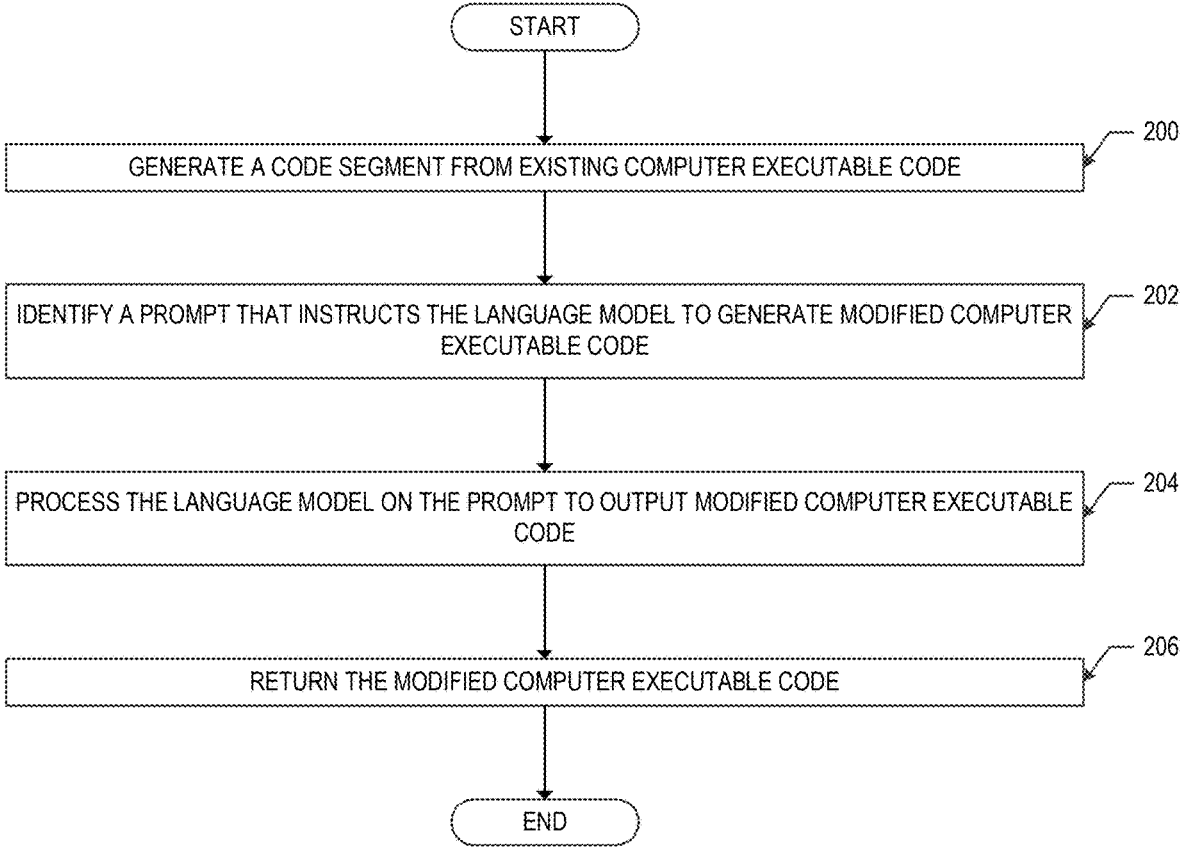
FIG. 2 shows a flowchart of a method for overcoming language model token limits when converting executable code, in accordance with one or more embodiments.

FIG. 2 shows a flowchart of a method for overcoming language model token limits when converting executable code, in accordance with one or more embodiments. The method of FIG. 2 may be implemented using the system of FIG. 1 and one or more of the steps may be performed on or received at one or more computer processors. The method of FIG. 2 may be characterized as a method of overcoming a token limit of a language model when converting an existing computer executable code to a modified computer executable code.

Step 200 includes generating a code segment from the existing computer executable code. The code segment is generated to be within the token limit.

Generating the code segment may be performed, for example, by subdividing the existing computer executable code into a number of logical segments of the existing computer executable code. Each of the number of logical statements is within the token limit, and may be further limited so that other parts of the prompt (identified at step 202, below), when combined with the code segment, remain within the token limit of the language model.

In this example, one of the number of logical segments is identified as the code segment being operated upon. Thus, for example, each code segment may be transformed serially, and then recombined after the method of FIG. 2. However, one or more embodiments also contemplate executing multiple language models on multiple prompts, each of the multiple prompts including one of the code segments. Thus, the method of FIG. 2 may also be performed, in part, and in parallel.

Step 202 includes identifying a prompt that instructs the language model to generate the modified computer executable code. The prompt includes a system command instructing the language model to convert the code segment to the modified computer executable code. The prompt also includes the code segment. The prompt also includes a map defining a mapping between the code segment and the modified computer executable code.

The prompt may be identified by performing one of generating the prompt and retrieving the prompt from a data repository. For example, the prompt may be generated by a computer technician or may be generated automatically (e.g., by commanding one or more language models to suggest a prompt for the code segment based on a predetermined prompt template). In another example, a pre-generated prompt may be retrieved from a data repository and then used at step 204.

One or more embodiments also include identifying a second prompt for a second language model. The second prompt instructs the second language model to perform a syntactical verification on the modified computer executable code. In other words, the second prompt and second language model verifies the output of the first language model mentioned above. In this example, the second language model may be processed on the modified computer executable code to output a rectified modified computer executable code. Rectified code means that syntactical errors are automatically identified and corrected by the second language model. The rectified modified computer executable code may be returned. Note that the second language model may be the same or different than the first language model mentioned above.

Further reductions in the token limit are also possible. For example, in one embodiment, the map may cause the prompt to exceed the token limit. In this case, the method may further include hashing, prior to processing the language model, at least one of the code segment and the data source such that the prompt is within the token limit. Hashing generates hashed information. Then, after the conversion of the existing computer executable code to the modified computer executable code, the method may include replacing, after processing the language model and prior to returning the modified computer executable code, the hashed information with the at least one of the code segment and the data source. Thus, the hashing may reduce the token limit during conversion, but the original information that was hashed may be restored after conversion.

Step 204 includes processing the language model on the prompt to output the modified computer executable code. The language model is processed on the prompt by commanding the computer to execute the language model on the prompt. Thus, the input to the language model is the prompt and the output of the language model is the modified computer executable code.

Note that while the algorithm that defines the language model is not changed, nevertheless the language model itself is improved by step 202. The language model is improved because, prior to the embodiments described herein, the language model could not automatically convert the existing computer executable code into the computer executable code due to the token limit. Thus, by overcoming the token limit of one or more embodiments, the language model is capable of performing a function that previously it could not perform. As a result, the language model itself is improved.

Step 206 includes returning the modified computer executable code. Returning the modified computer executable code may include storing the modified computer executable code in a data repository. Returning the modified computer executable code may include displaying the modified computer executable code on a display device. Returning the modified computer executable code may include transmitting the modified computer executable code to an enterprise system programmed to convert instances of an updated data source. Returning the modified computer executable code may include combinations of the above examples, as well as other techniques for returning data or code.

The method of FIG. 2 may be varied. For example, the method of FIG. 2 may be performed with respect to converting existing extract, transform, and load (ETL) code when a data source type changes, and the existing ETL code no longer functions on the modified data source type. The method of FIG. 2 may be performed to generate, automatically using the language model despite the language model's token limit, modified ELT code that may function as desired on the modified data source type. In the example, the prompt further includes an updated data source upon which the modified ETL code is to execute, and upon which the existing ETL cannot execute to generate a desired output.

Continuing the example, adding an overall updated data source may cause the prompt to exceed the token limit. The updated data source may include a portion of the overall updated data source. In this case, the method further may include extracting the portion of the overall updated data source to generate the updated data source. The portion of the overall updated data source causes the prompt to be within the token limit.

In other words, less than all of the data source is used. Namely, selected portions of the data source may be extracted or selected in order to control the number of tokens being supplied to the prompt.

The selected portion of the updated data source may be limited to the code segment currently being converted. For example, the portion of the overall updated data source may be limited to a data call command contained in the code segment.

Still other variations are possible. Thus, one or more embodiments are not necessarily limited by the examples provided above.

While the various steps in the flowchart of FIG. 2 are presented and described sequentially, at least some of the steps may be executed in different orders, may be combined or omitted, and at least some of the steps may be executed in parallel. Furthermore, the steps may be performed actively or passively.

Figure 3:
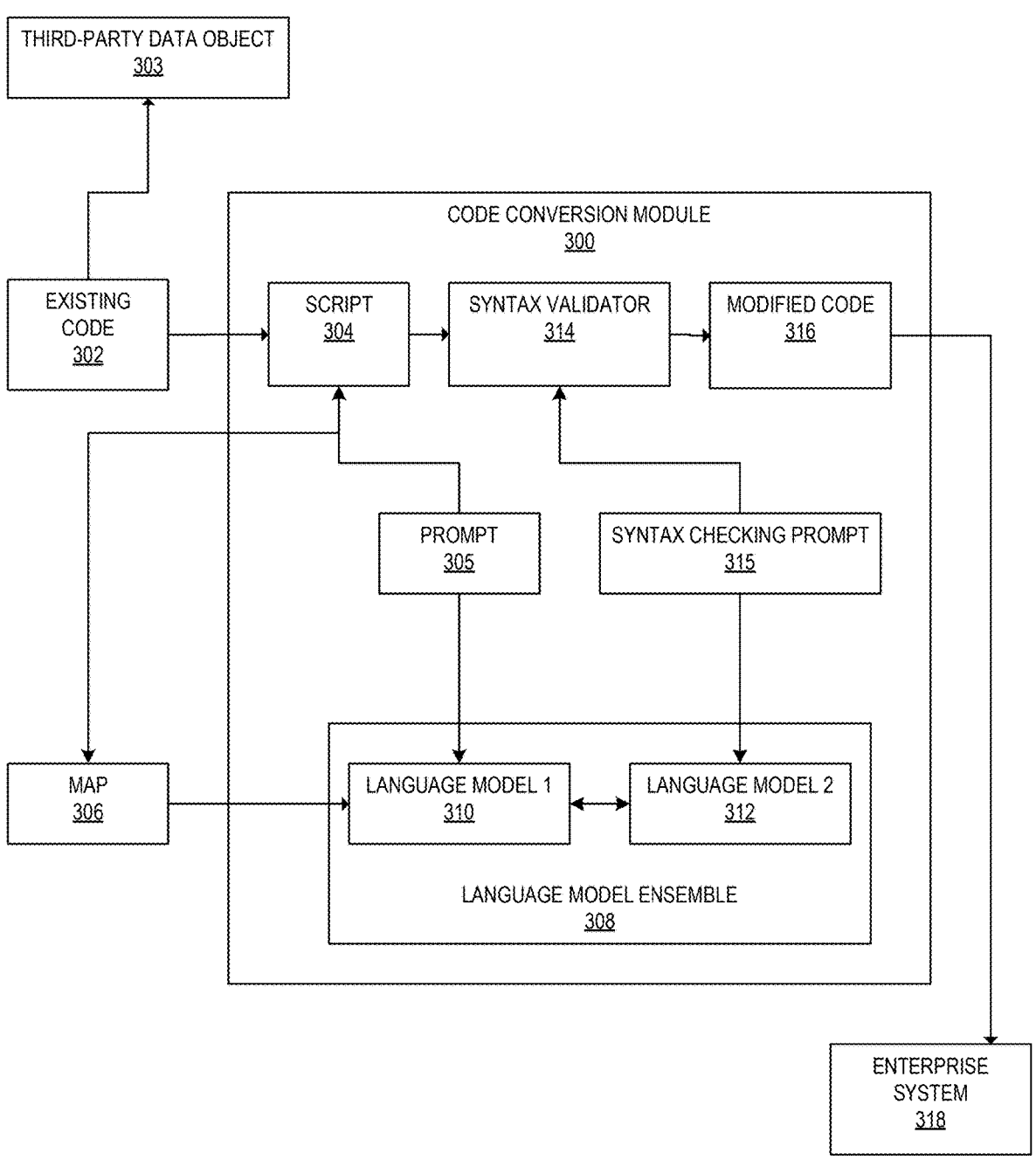
FIG. 3 shows an example of a system for overcoming language model token limits when converting executable code, in accordance with one or more embodiments.

FIG. 3 shows an example of a system for overcoming language model token limits when converting executable code, in accordance with one or more embodiments. FIG. 4A, FIG. 4B, FIG. 4C, FIG. 4D, FIG. 4E, and FIG. 4F show an example of the conversion of ETL computer executable code, in accordance with one or more embodiments. The following example is for explanatory purposes only and not intended to limit the scope of one or more embodiments.

In particular, the system of FIG. 3 shows a code conversion module (300) useable to convert existing code (302) to modified code (316). In the example, the existing code (302) is ETL computer executable code that is programmed to, when executed by a computer processor, access a third-party data object (303). The existing code (302) gathers information from the third-party data object (303) into a local, proprietary format useful for computer programs hosted by an enterprise system (318) (described below). However, the owner of the third-party data object (303), without notice to the owner of the enterprise system (318), changes the third-party data object (303) to include modified data types, to remove certain older data types, and change the formatting of some of the remaining older data types. Therefore, when the existing code (302) executes on the third-party data object (303), an error is returned (i.e., the existing code (302) no longer functions for an intended purpose when executed on the third-party data object (303)).

Nevertheless, much of the existing code (302) may be re-used. In other words, in most cases, only some changes may be made to the existing code (302) to update the existing code (302) into the modified code (316) (described below). A processor then can execute the modified code (316) on the third-party data object (303) and obtain the desired information in a format suitable for consumption by applications hosted by the enterprise system (318). However, updating the existing code (302) may be time consuming and difficult, or in some cases impossible, because of a continuous pipeline of different modules of existing code that may be updated from time to time to be executable on other data objects.

For example, there may be many third-party banks, each periodically and independently changing the data objects that define their financial data (i.e., their versions of the third-party data object (303)). The owner of the enterprise system (318) therefore may maintain many modules of ETL computer executable code, one for each of the data objects.

Because thousands of modules of ETL computer executable code may exist, a continuous pipeline of instances may exist of the existing code (302) that are to be updated to instances of the modified code (316) to continue to download and translate the various third-party data objects into information useful for consumption by financial management applications hosted by the enterprise system (318). Because the continuous pipeline of existing code modules cannot be updated manually within a reasonable timeframe, an automated and reliable code conversion module (300) is provided in order to solve the technical problem of automated and reliable code conversion.

By way of example, a single instance of converting the existing code (302) is referred to in the system example of FIG. 3. However, as indicated above, it is anticipated that the existing code (302) may be a pipeline of different instances of existing code (302), all of which may be updated according to the example provided herein.

In particular, the existing code (302) is provided to a script (304). The script (304) is a computer executable code which, when executed by a computer processor, moderates the code translation process according to the method of FIG. 2. Thus, the script (304) may be the server controller (120) of FIG. 1.

The script (304) identifies a map (306) applicable to the existing code (302). The map (306) may be provided by a computer scientist or technician, or may be stored in a library of maps. In an embodiment, a language model in the language model ensemble (308) may generate the map (306).

In any case, the script (304) generates a prompt (305) which includes the existing code (302), the map (306), and at least some of the modified aspects of the third-party data object (303). In an embodiment, the script (304) may break apart the existing code (302) into logical sub-parts that may be treated individually according to the procedure described below and with respect to FIG. 2.

The script (304) calls on the language model 1 (310) to execute on the prompt (305). The output of the existing code (302) is a modified version of the existing code (302) that may be executable on the third-party data object (303). However, the output of the language model 1 (310) may, or may not, be fully accurate. In particular, the initial output of the language model 1 (310) may include technical syntax errors in the initial modified computer executable code output by the language model 1 (310).

Thus, in an embodiment, a syntax validator (314) (which may be part of the server controller (120) of FIG. 1) may coordinate execution of a language model 2 (312). In an embodiment, the language model 1 (310) and the language model 2 (312) may be the same model, but utility may exist to using separately trained language models, one trained specifically to generate the code and one trained specifically to check the syntax of code.

In any case, the syntax validator (314) generates a syntax checking prompt (315) (i.e. a prompt that includes a command to check the syntax as well as the initial updated computer executable code output by the language model 1 (310)). The syntax validator (314) calls on the language model 2 (312) to execute on the syntax checking prompt (315). The syntax validator (314), or the language model 2 (312) or some other language model in the language model ensemble (308), then may correct detected technical syntax errors in the initial updated computer executable code output by the language model 1 (310).

The output of the syntax validator (314) (or of the language model 2 (312) in some embodiments) may be modified code (316). The modified code (316) is then provided to an enterprise system (318). In the example of FIG. 3, the enterprise system (318) is one or more servers and associated communication hardware and power systems that host online financial management applications which consume information from the third-party data object (303). However, in the example, the enterprise system (318) first is executed by the enterprise system (318) to perform ETL (extract, transform, load) data transformation on the newly modified third-party data object (303). The output of the modified code (316) is one or more data structures that present the information in the third-party data object (303) in a format consumable by the financial management applications (or other application(s) hosted by the enterprise system (318)).

In an embodiment, as mentioned above, the existing code (302) may be broken into sub-modules of code. In this case, multiple sub-modules of the modified code (316) may be output. Thus, one or more embodiments contemplate combining the sub-modules of the modified code (316) into a modified, assembled version of the existing code (302), prior to hosting the modified code (316) on the enterprise system (318).

FIG. 4A shows an example of the prompt (305) shown in FIG. 3 (and thus also may be an example of the prompt (112) shown in FIG. 1). The prompt (400) includes a command (402) to select a code segment (404) and to convert the code segment (404) to the updated code. The prompt (400) also includes a map (406) that describes how the language model is to perform the code conversion from the existing code (i.e., the code segment (404)) to the updated code. Individual portions of the third-party data object are referred to in the code segment (404), such as the data reference (408) labeled as "txd.customer.id" which is anticipated to exist in the third-party data object.

FIG. 4B shows an example of a map (410). The map (410) may replace, or be used in addition to, the map (406) in FIG. 4A. In embodiments of the invention, the map (410) is a comma separated value (CSV) data structure. The map (410) indicates how names are to be converted in the code segment (404) to the modified code segment.

Data not relevant to the conversion process may be hashed, such as in hash column (412) and hash column (414). Hashing the data in the column and tab portions of the third-party data object dramatically reduces the number of tokens provided as input to the language model, and also reduces the number of output tokens in the updated code segment. However, before returning the modified code segment, the hashed data may be replaced with the original data (prior to hashing). In this manner, the modified code segment may include relevant data and information when provided for hosting on the enterprise system.

FIG. 4C and FIG. 4D show an example of the output of the language model 1 (310) of FIG. 3. Thus, the output (416) is the updated code (316) (and also is the updated code segment shown in FIG. 4A). The output (416) initially is shown in FIG. 4C, and is continued in FIG. 4D. Thus, FIG. 4C and FIG. 4D refer to the same output (416) and hence use the same reference numeral. The output (416) represents a transformation of the existing (or original) executable code in the prompt (400) into a modified format suitable for use on the modified third-party data structure.

FIG. 4E and FIG. 4F show an example of the output of the second language model after conversion. Thus, the second output (418) is syntax corrected after the language model 2 (312) executed the syntax checking prompt (315) on the output (416) of the language model 1 (310). The second output (418) initially is shown in FIG. 4E, and is continued in FIG. 4F. Thus, FIG. 4E and FIG. 4F refer to the same second output (418) and hence use the same reference numeral. The second output (418) is the final updated code that is hosted on the enterprise system (318), and which may be executed on the third-party data object (303) to generate the desired information in the desired format for use by the financial management applications (or other application) also hosted on the enterprise system (318).

The examples of FIG. 3 through FIG. 4F show multiple instances of saving tokens. For example, the existing code (302) may be a segment of a larger code set, thereby saving tokens by avoiding conversion of the larger code set at one time. Additionally, the map in FIG. 4C may include hashed data to further reduce token use and reduce the number of tokens generated as output. Still further, the process may use a second language model to perform syntax checking on the initial modified code. Thus, the process of generating the final code not only may be made more accurate, but also may save token use or output by the language model 1 (310). Still other token savings may be achieved, as described with respect to FIG. 1 and FIG. 2.

Thus, one or more embodiments may overcome language model token limits when converting executable code. Accordingly, it may be said that one or more embodiments improve a language model by permitting the language model to perform code conversion that otherwise the language model could not perform by reason of otherwise exceeding token limits of the language model.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
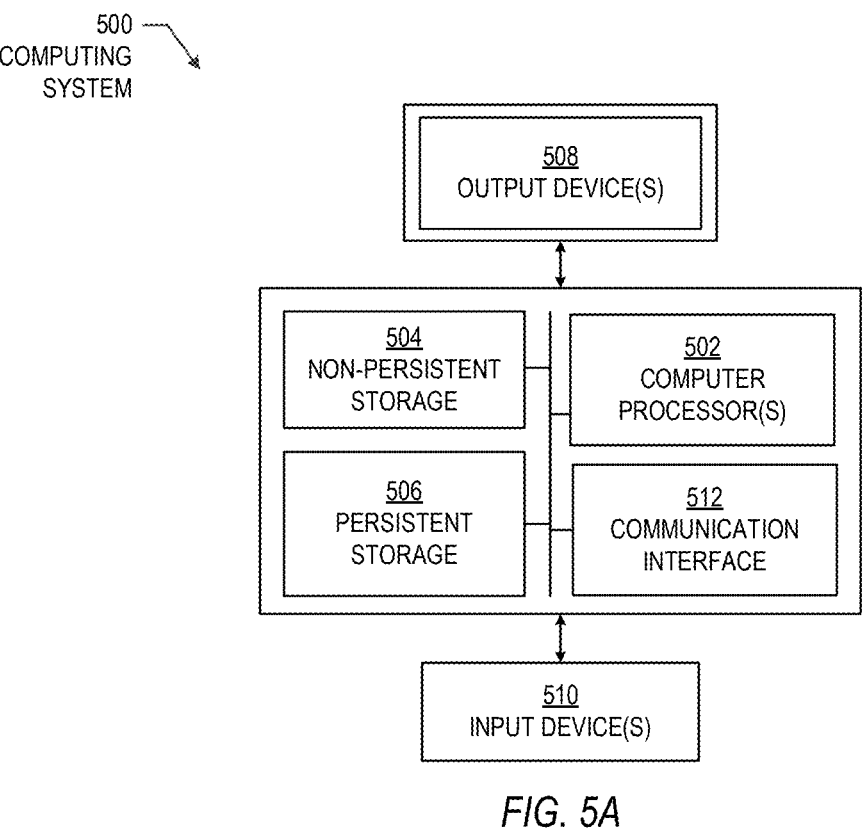
FIG. 5A and FIG. 5B show a computing system and network environment, in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
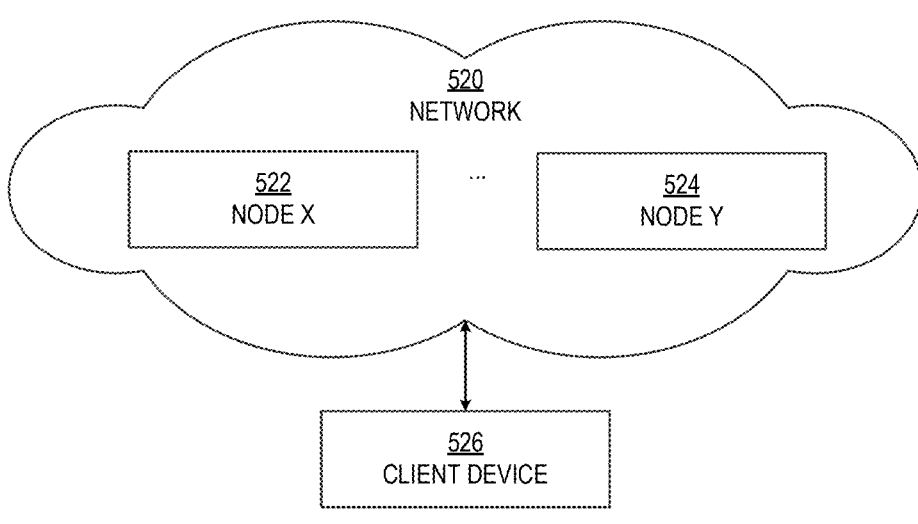

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method of overcoming a token limit of a language model when converting an existing computer executable code to a modified computer executable code, the method comprising:

generating a code segment from the existing computer executable code, wherein the code segment is generated to be within the token limit, wherein the existing computer executable code comprises an existing extract, transform, and load (ETL) code;

identifying a prompt that instructs the language model to generate the modified computer executable code, the prompt comprising:

a system command instructing the language model to convert the code segment to the modified computer executable code, wherein the modified computer executable code comprises a modified ETL code, the code segment, a map defining a mapping between the code segment and the modified computer executable code, and an updated data source upon which the modified ETL code is to execute, and upon which the existing ETL cannot execute to generate a desired output;

processing the language model on the prompt to output the modified computer executable code; and returning the modified computer executable code.

2. The method of claim 1, wherein generating the code segment comprises:

subdividing the existing computer executable code into a plurality of logical segments of the existing computer executable code, wherein the plurality of logical statements each is within the token limit; and identifying one of the plurality of logical segments as the code segment.

3. The method of claim 1, wherein the map causes the prompt to exceed the token limit, and wherein the method further comprises:

hashing, prior to processing the language model, at least one of the code segment and a data source upon which the code segment executes such that the prompt is within the token limit, wherein hashing generates hashed information; and replacing, after processing the language model and prior to returning the modified computer executable code, the hashed information with the at least one of the code segment and the data source.

4. The method of claim 1, wherein adding an overall updated data source causes the prompt to exceed the token limit, wherein the updated data source comprises a portion of the overall updated data source, and wherein the method further comprises:

extracting the portion of the overall updated data source to generate the updated data source, wherein the portion of the overall updated data source causes the prompt to be within the token limit.

5. The method of claim 4, wherein the portion of the overall updated data source is limited to a data call command contained in the code segment.

6. The method of claim 1, wherein identifying the prompt includes one of generating the prompt and retrieving the prompt from a data repository.

7. The method of claim 1, further comprising:

identifying a second prompt for a second language model, wherein the second prompt instructs the second language model to perform a syntactical verification on the modified computer executable code;

processing the second language model on the modified computer executable code to output a rectified modified computer executable code; and returning the rectified modified computer executable code.

8. The method of claim 7, wherein the second language model is different than the language model.

9. The method of claim 1, wherein returning the modified computer executable code comprises at least one of:

storing the modified computer executable code in a data repository;

displaying the modified computer executable code on a display device; and transmitting the modified computer executable code to an enterprise system programmed to convert instances of an updated data source.

10. A system comprising:

a computer processor;

a data repository in communication with the computer processor and storing:

an existing computer executable code, wherein the existing computer executable code comprises an existing extract, transform, and load (ETL) code, a code segment from the existing computer executable code, a modified computer executable code, wherein the modified computer executable code comprises a modified ETL code, a map defining a mapping between the code segment and the modified computer executable code, a prompt that instructs a language model to generate the modified computer executable code, the prompt comprising:

a system command instructing the language model to convert the code segment to the modified computer executable code, the code segment, an updated data source upon which the modified ETL code is to execute, and upon which the existing ETL cannot execute to generate a desired output, and the map;

the language model, executable by the computer processor and comprising a token limit, wherein the code segment is within the token limit; and a server controller executable by the computer processor to:

generate the code segment, process the language model on the prompt to output the modified computer executable code, and return the modified computer executable code.

11. The system of claim 10, wherein the server controller is programmed to generate the code segment by:

subdividing the existing computer executable code into a plurality of logical segments of the existing computer executable code, wherein the plurality of logical statements each is within the token limit; and identifying one of the plurality of logical segments as the code segment.

12. The system of claim 10, wherein the map causes the prompt to exceed the token limit, and wherein the server controller is further executable by the computer processor to:

hash, prior to processing the language model, at least one of the code segment and a data source upon which the code segment executes data source such that the prompt is within the token limit, wherein hashing generates hashed information from original information; and replace, after processing the language model and prior to returning the modified computer executable code, the hashed information with the original information.

13. The system of claim 10, wherein adding an overall updated data source causes the prompt to exceed the token limit, wherein the updated data source comprises a portion of the overall updated data source, and wherein the server controller is further executable by the computer processor to:

extract the portion of the overall updated data source to generate the updated data source, wherein the portion of the overall updated data source causes the prompt to be within the token limit.

14. The system of claim 13, wherein the portion of the overall updated data source is limited to a data call command contained in the code segment.

15. The system of claim 10, wherein the server controller is further executable by the computer processor to identify the prompt by performing one of generating the prompt and retrieving the prompt from the data repository.

16. The system of claim 10, further comprising:

a second language model executable by the computer processor, wherein the server controller is further executable by the computer processor to:

identify a second prompt for a second language model, wherein the second prompt instructs the second language model to perform a syntactical verification on the modified computer executable code;

process the second language model on the modified computer executable code to output a rectified modified computer executable code; and return the rectified modified computer executable code.

17. The system of claim 16, wherein the second language model is different than the language model.

18. A method of overcoming a token limit of a language model when converting an existing computer executable code to a modified computer executable code, the method comprising:

generating a code segment from the existing computer executable code, wherein the code segment is generated to be within the token;

extracting a portion of an updated data source upon which the modified computer executable code is to execute, and upon which the existing computer executable code cannot execute to generate a desired output, wherein the portion is within the token limit;

hashing at least one of the code segment and the updated data source, wherein hashing generates a hashed data structure, wherein the hashed data structure is within the token limit;

identifying a prompt that instructs the language model to generate the modified computer executable code, the prompt comprising:

a system command instructing the language model to convert the code segment to the modified computer executable code, the hashed data structure, wherein a combination of the system command and the hashed data structure is within the token limit;

processing the language model on the prompt to output a provisional computer executable code;

replacing the hashed data structure in the provisional computer executable code with the at least one of the code segment and the updated data source to generate the modified computer executable code; and returning the modified computer executable code.

* * * * *